Figure 1:
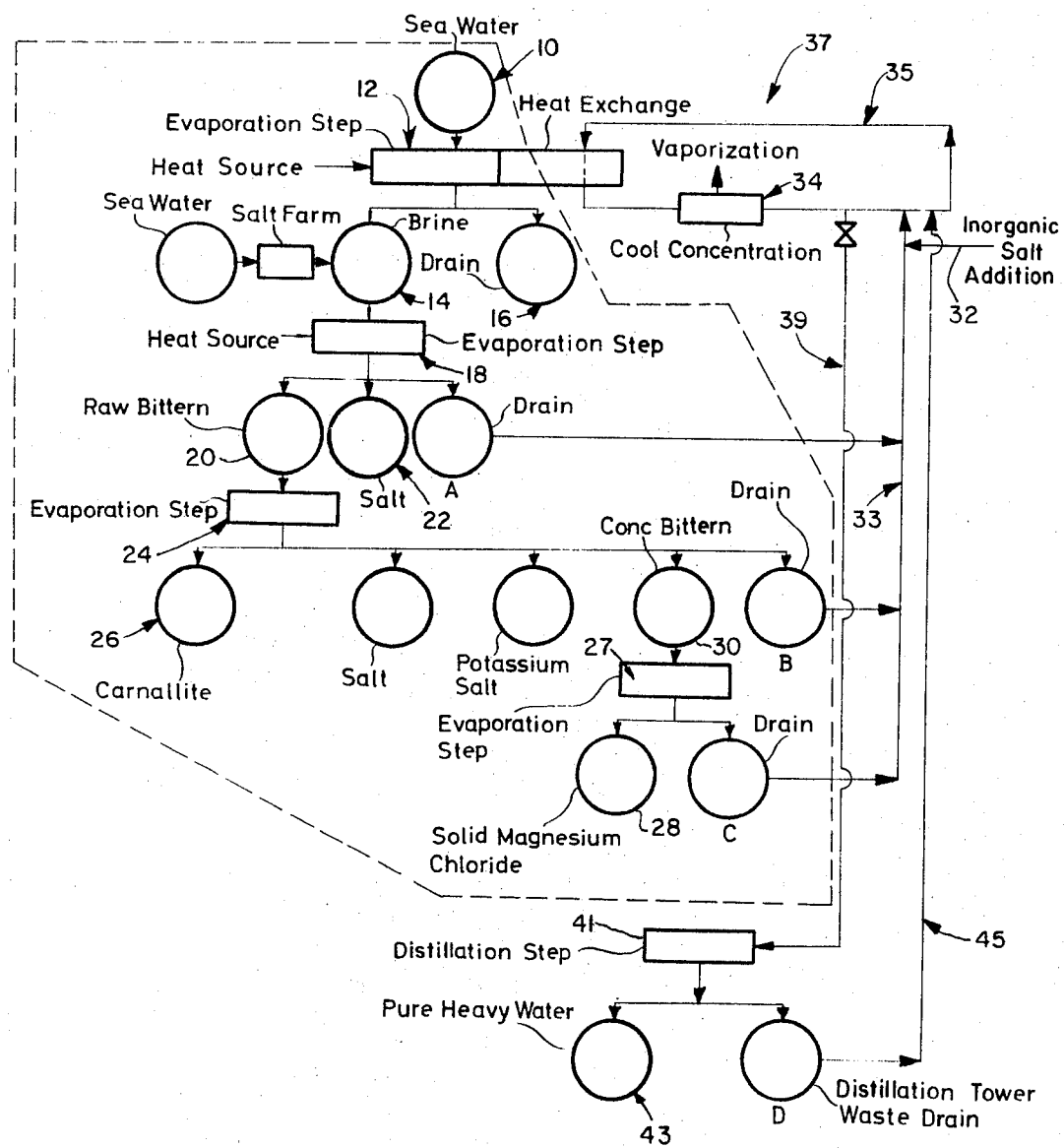

United States Patent [19]
Tabata et al.

[11] 3,870,606
[45] Mar. 11, 1975

[54] PROCESS FOR PREPARING HEAVY WATER FROM SEA WATER

[76] Inventors: Hisanobu Tabata; Norimasa Tabata, both of 968, Kou, Ohgoshi-machi; Robkuo Nakajima, 1831, Ohyabu-cho, all of Sakaide-shi, Kagawa-ken, Japan

[22] Filed: May 26, 1972

[21] Appl. No.: 257,352

Related U.S. Application Data
[63] Continuation of Ser. No. 47,992, June 22, 1970, abandoned.

[30] Foreign Application Priority Data
June 26, 1969 Japan................................. 44-50501
Aug. 18, 1969 Japan................................. 44-65148

[52] U.S. Cl......................... 203/5, 203/10, 159/47, 159/45, 159/DIG. 12
[51] Int. Cl............................ B01d 1/00, B01d 3/00
[58] Field of Search.............. 159/DIG. 12, DIG. 27; 203/5, 10, 11; 23/204 R, 204 C, 204 P; 423/580

[56] References Cited
UNITED STATES PATENTS
2,999,795  7/1972  Tabata et al..................... 423/580 X
2,999,795  9/1961  Yagi et al........................... 203/10

OTHER PUBLICATIONS
"Heavy Water" Chemical Eng. Progress, Vol. 50, No. 5, pp. 221–229, May 1954.
"Production of Heavy Water" Chemical Eng. Progress, Vol. 55, No. 9, pp. 70–78, September 1959.

*Primary Examiner*—Jack Sofer
*Attorney, Agent, or Firm*—Toren and McGeady

[57] ABSTRACT

Process for preparing heavy water from the sea water, comprising collecting drains, i.e., condensate; produced in the manufacture of common kitchen salt from sea water treatment and in the treatments of by-products from the manufacturing process, adding to the mixture of drains a small amount of inorganic salts, warming the mixture of drains above room temperature and below 40°C by the exhaust heat evolved in the evaporation stage of the salt manufacturing process, in a cool concentration apparatus, and then further concentrating the mixture thus obtained in a thermal evaporation step.

1 Claim, 8 Drawing Figures

PROCESS FOR PREPARING HEAVY WATER FROM SEA WATER

The present invention relates to a process for preparing heavy water from sea water.

In recent years, the advent of atomic reactors has remarkably increased the demand for heavy water as a moderator for neutrons. Various improvements have been made in the processes for preparing heavy water, but an improved process is required by which heavy water can be produced on a commercial scale.

The present invention constitutes such a commercially feasible process. This is a process for preparing heavy water from sea water comprising collecting drains, i.e., condensates which are formed from the manufacture of common table salt by evaporating sea water and the processes for treating the by-products obtained therefrom, adding to the drains a small amount of an inorganic salt, concentrating the resulting solution at between room temperature and 40°C by means of a cool concentrating apparatus using the exhaust heat from the initial sea water evaporation process, and then concentrating the mixture thus obtained in a conventional thermal evaporation step.

Heavy water which is isotopic to ordinary light water naturally occurs in the concentration 0.014 to 0.015 percent in ordinary waters and approximately 0.02 percent in sea water. Since the chemical properties of heavy water are the same as those of light water, the physical properties are utilized in the preparation of heavy water.

The physical properties of light and heavy water are shown in Table 1.

Table 1

| | Light water ($H_2O$) | Heavy water ($D_2O$) |
|---|---|---|
| Specific gravity (25°C) | 1.00000 | 1.10775 |
| Temperature of the maximum specific gravity | 4°C | 11.6°C |
| Adiabatic compressibility (20°C) ($cm^3$/dyne) | $4.48 \times 10^{-11}$ | $4.63 \times 10^{-11}$ |
| Melting point | 0.000°C | 3.81°C |
| Boiling point | 100.00°C | 101.43°C |
| Vapor pressure (0°C) | 4.58mmHg | 3.65mmHg |
| Molar heat of vaporization (100°C) | 9719 cal | 9927 cal |

Heavy water has up to now been prepared by the following methods utilizing the differences in the physical properties between light and heavy water.
1. Liquified rectification of hydrogen,
2. Distillation of water,
3. Electrolysis of water,
4. Recovery by a exchange reaction, and
5. Exchange at two temperatures.

The single methods alone were used only for the initial concentration step. Thus final stage concentration was usually achieved, for example, by reduced volume electrolysis. Other methods were employed as auxiliary methods by which relatively low concentration heavy water was prepared, starting from ordinary water, as material to be used in the reduced volume electrolysis process. This is generally called "the concentrating process at a low concentration" or "former concentration".

The subsequent stage of concentration in which low concentration heavy water obtained in the previous operation was further condensed to a purity over 99.6 percent which may be used, for example, for the moderator in an atomic reactor, is called "the concentrating stage to a high concentration" or "later concentration".

Since hydrogen (H) and heavy hydrogen (D) are isotopic and have substantially identical chemical properties, the separation of light water ($H_2O$) and heavy water ($D_2O$) must rely on the differences in their physical properties. In addition, the extremely small heavy water content of natural water makes the separation extraordinarily difficult, and therefore all of the above processes primarily aim to increase the separation coefficient.

Processes for preparing heavy water utilize in principle:
1. the difference in vapor pressure;
2. the difference in separation coefficients at electrolysis; and
3. the difference in the equilibrium constants in exchange reactions;

of light and heavy waters. The process of the present invention, however, has as its primary object, increasing the separation coefficients of light and heavy waters in those processes, and has been arrived at after extensive investigations.

The separation coefficients at electrolysis are not constant in different operations, but vary and are dependent, for example, on the substance and the surface condition of the electrodes, the temperature, and the current density in the electrolysis.

Also in the distillation process of this invention, it was confirmed in the experiments that the separation coefficients of light and heavy waters vary remarkably, depending on the manner in which the distillation is conducted, the concentrations of the dissolved salts, the rate of evaporation and the evaporation temperature. The present invention takes these facts into consideration.

As for the cost of preparing heavy water, approximately 80 percent of the total cost is usually needed for the so-called former concentration in which heavy water is concentrated from its naturally occurring concentration up to about 1 percent.

Thus, in the production of heavy water, the former concentration influences the cost to the largest extent and the process by which the former concentration is conducted is the most important.

In the Spevack method, for example, which is the most notable in the United States in recent years,
1. ordinary water having a heavy water content of 0.014 to 0.015 percent is condensed by the exchange method at two temperatures to 15 to 20 percent.
2. next, the resulting water is further concentrated to approximately 90 percent by fractional distillation, and
3. finally the condensate is concentrated to 99.8 percent by electrolysis.

In the exchange method at two temperatures employed in this process, deuterium in heavy water is exchanged by hydrogen in hydrogen sulfide to produce ordinary water and deuterium sulfide. The problem of this Spevack method consists in the expense of the former concentration which corresponds to as much as 95 percent of the whole process and in which ordinary water having a heavy water content of 0.015 percent is concentrated up to approximate 1 percent.

The present invention performs the former concentration, in the treatment of sea water, by a cool concentration procedure very reasonably and with great benefits. Additionally, the present process increases the efficiency of the concentration step as a whole by returning to this former concentration step, the low concentration drain (containing about 0.2 percent heavy water) which is formed at the later concentration where the product from the former concentration is condensed by distillation to obtain the final product.

The features of this invention reside in the ingenious and economical combination of the preparation of heavy water from sea water, which contains a larger amount of heavy water than fresh water and combining this process with the manufacture and purification of kitchen salt and associated by-products from sea water.

The present invention relates to the distillation method in the process for preparing heavy water. Ordinary water is generally composed of $H_2O$, HDO and $D_2O$. The vapor pressure of either of HDO and $D_2O$ is slightly lower than that of $H_2O$ so that both HDO and $D_2O$ are gradually concentrated in the residual water of distillation.

Further the present invention relates to a process for preparing heavy water by evaporating sea water characterized by conducting the flash evaporation at a salt concentration of 5 to 15 percent, a rate of evaporation of 70 to 1000 $kg/m^2 \cdot hr$ and at a temperature 34° to 90°C to obtain low concentration heavy water. Additionally, the present invention provides a process for preparing heavy water by evaporating sea water characterized by a concentrating warm sea water, which has been warmed with a heat exchanger, at a relatively low temperature in a cool concentrating apparatus, leading the cool concentrated sea water to a flash evaporator to a salt concentration of 5 to 15 percent, a rate of evaporation of 70 to 1000 $kg/m^2 \cdot hr$ and at a temperature 34° to 90°C, evaporating the above obtained brine in an evaporator, from which both the vapor and drain (i.e., condensate) are evaporated in a flash evaporator (designated the former concentration) and by subsequently conducting the later concentration of the formerly concentrated heavy water solution in an evaporating tower.

Figure 2:
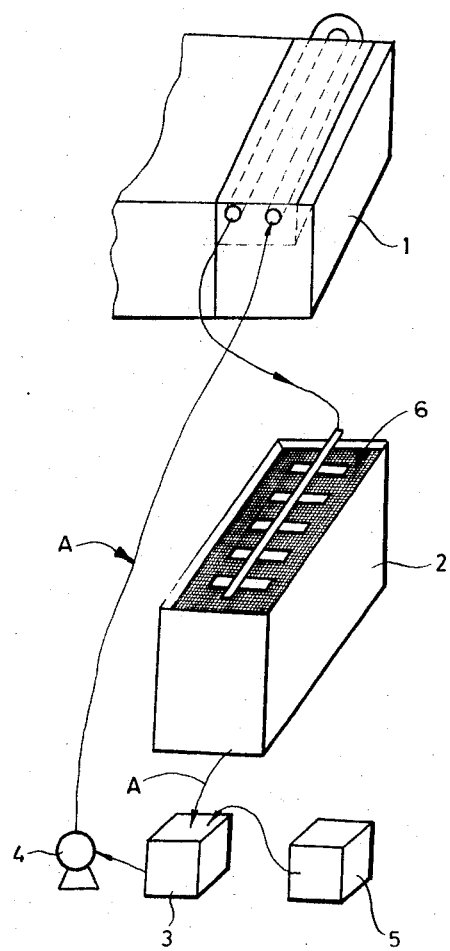
Figure 3:
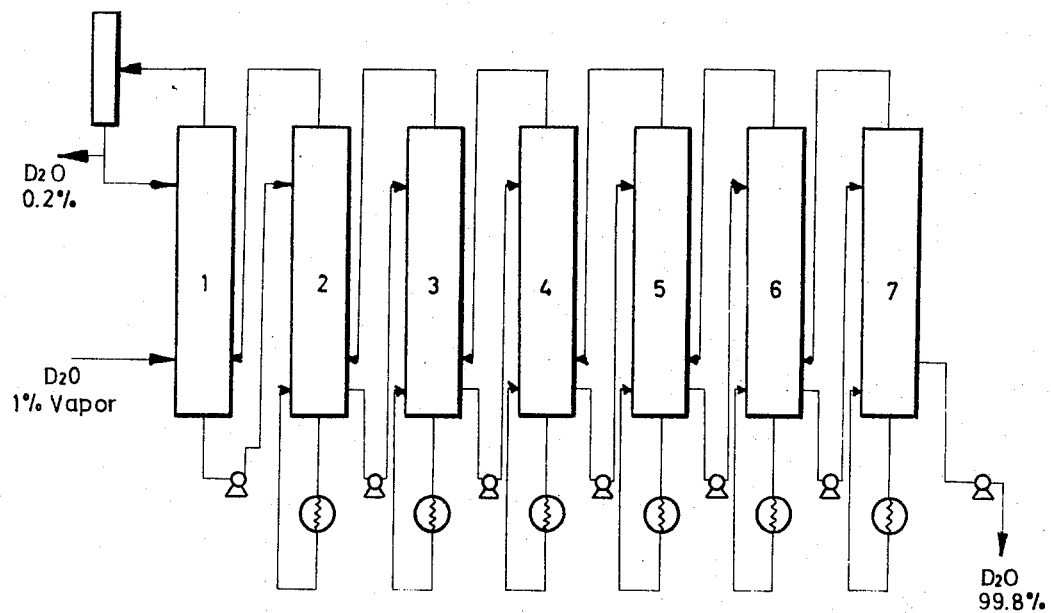

The present invention will be described in detail in reference to the attached drawings in which:

FIG. 1 is a flow sheet of an example of this invention, FIG. 2 is an explanatory figure of a cool concentration apparatus of the same example and FIG. 3 is an explanatory figure of the later concentration in the same example.

Figure 4:
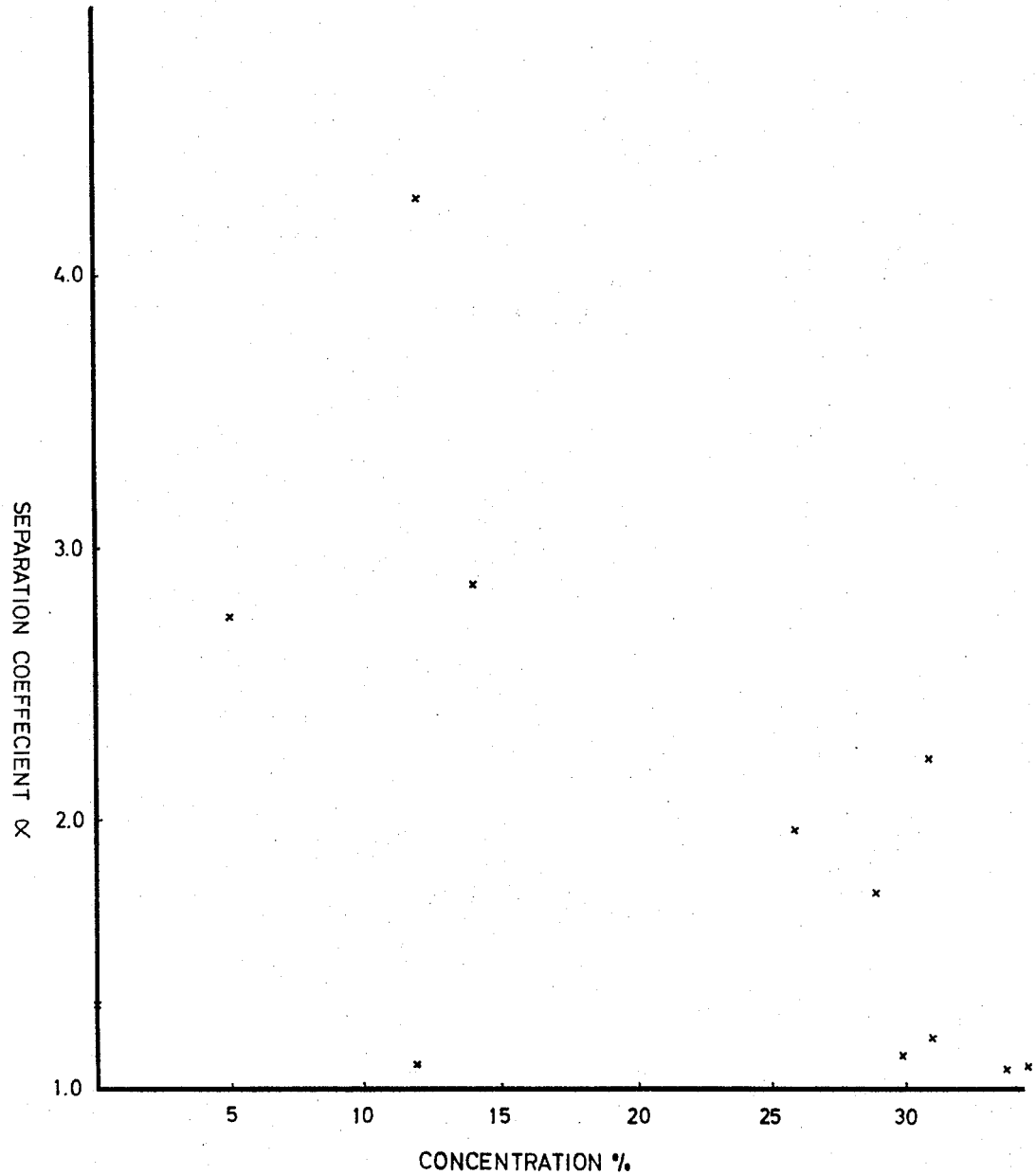
Figure 5:
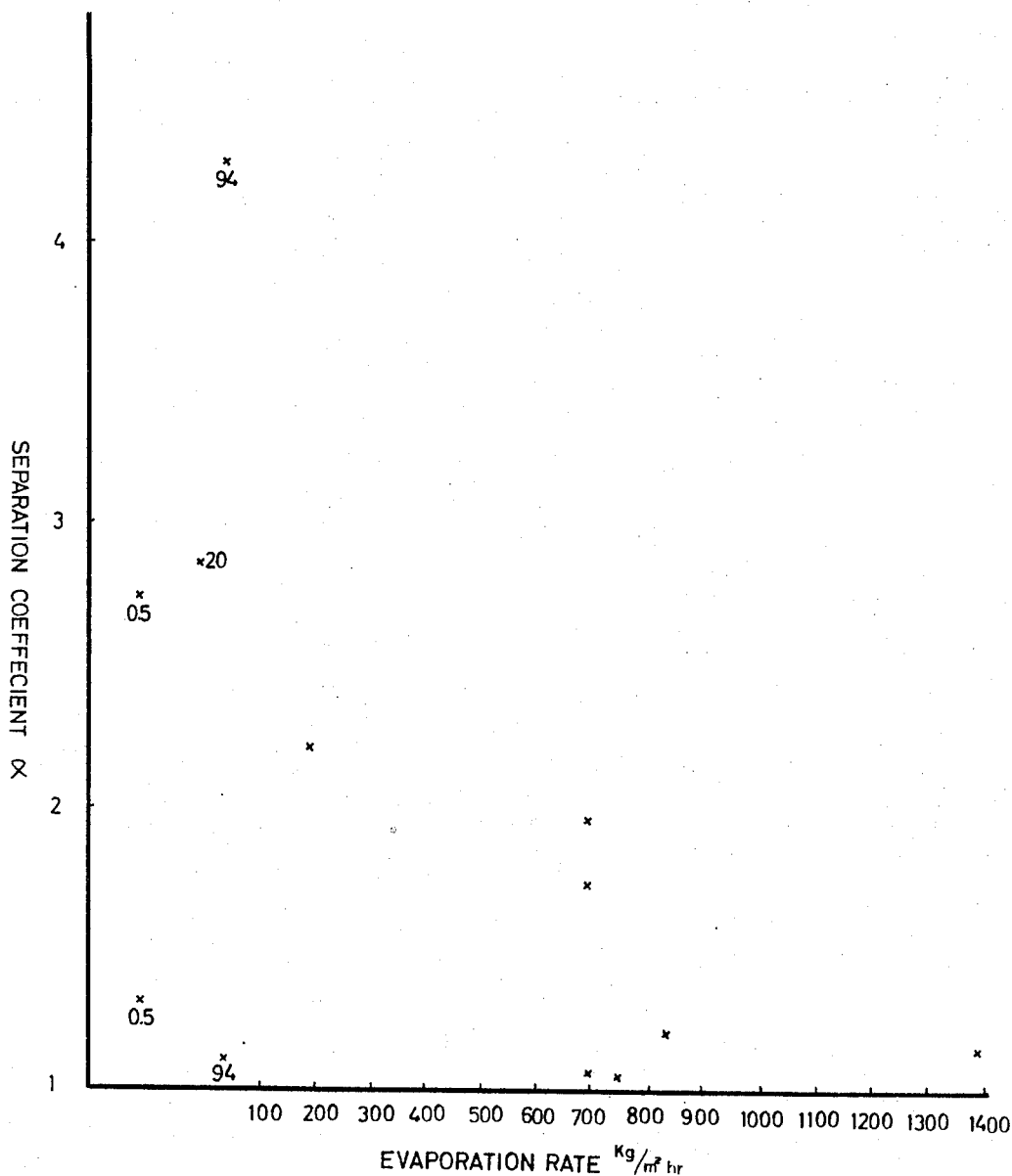
Figure 6:
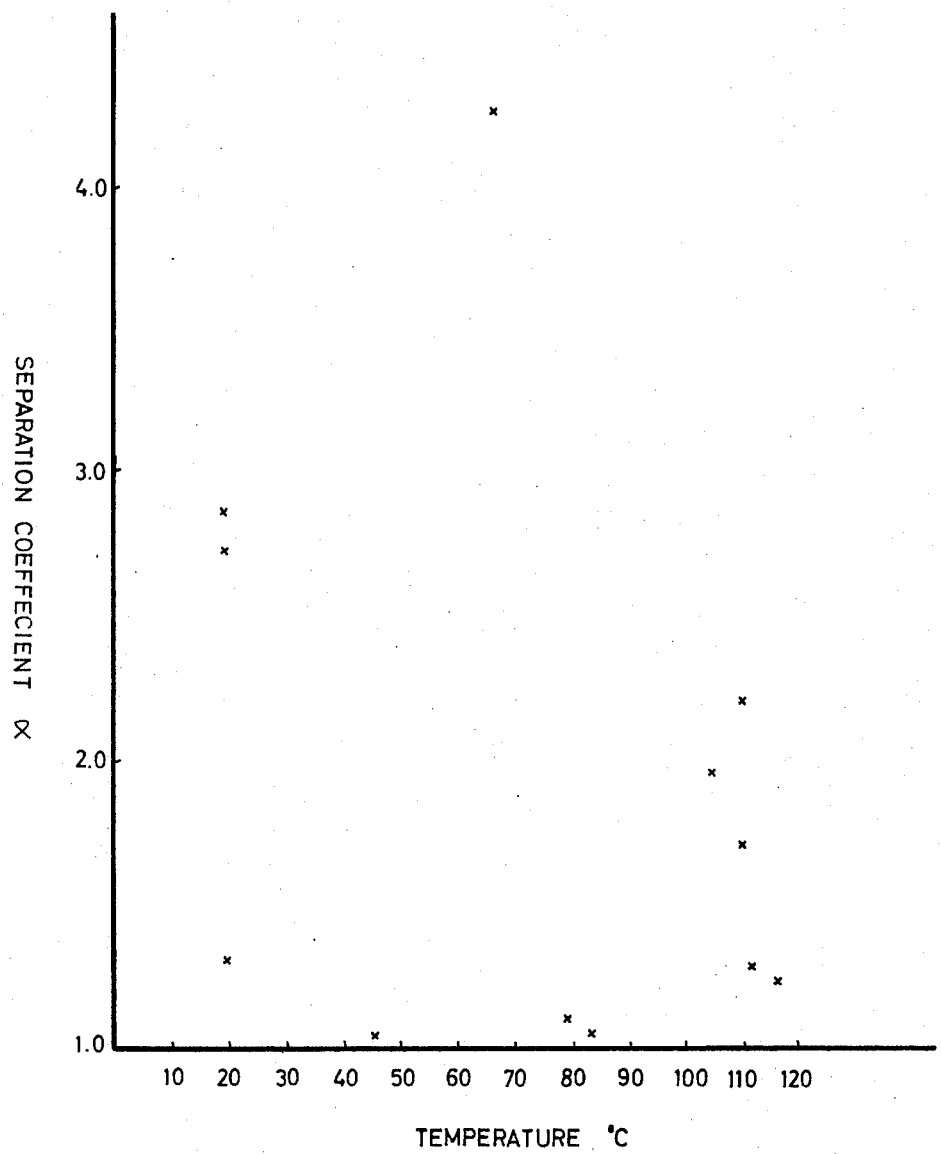
Figure 7:
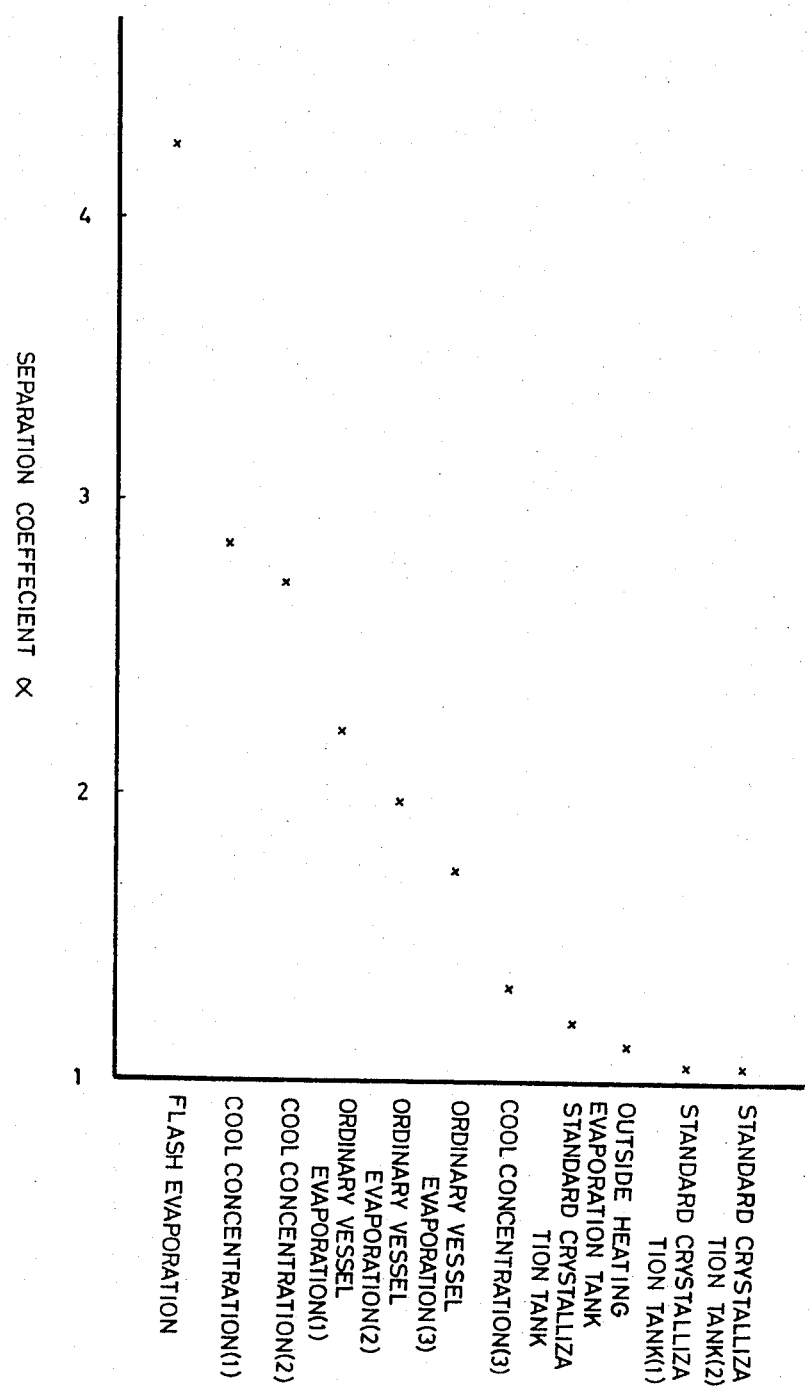

FIG. 4 shows the relation between the separation coefficient and the concentration of light and heavy waters in the flash evaporation process of this invention. FIG. 5 shows the relation between the separation coefficient and the evaporation rate, FIG. 6 shows the relation between the separation coefficient and the temperature, and FIG. 7 shows the relation between the separation coefficient and the mode of evaporation.

In FIG. 1, that part of the process which is enclosed with the broken lines constitutes the conventional evaporation sequence which is used in the manufacture of common salt and other by-products, e.g., magnesium, chloride, potassium salts, etc., from sea water. Thus, it is understood that one of the major advantages of the present process is that it may be combined with the conventional sea water evaporation process, to further enhance its value by producing heavy water from the condensates normally obtained from the salt manufacture process.

Referring now to the flow diagram in FIG. 1, that portion of the process which refers to the conventional evaporation of sea water will be discussed first. As shown in FIG. 1, sea water at 10 is subjected to a conventional evaporation step indicated at 12. Evaporation step 12 requires, of course, a heat source, as indicated, and the evaporator in evaporation step 12 also possesses a heat exchange portion which will be discussed later.

From the evaporation step, a brine or a concentrate 14 is obtained and a condensate or drain, 16 is obtained. Understandably, the condensate or drain 16 is obtained by condensing the evaporated vapors in evaporation step 12. In order to facilitate the explanation and simplify the diagram, however, the actual condensation step of the various vapors has been omitted. Thus, as discussed hereinafter, from each evaporation step, a residue and a condensed vapor, i.e., drain or condensate is obtained and is indicated in FIG. 1.

Alternately, the brine 14 and drain 16 could be obtained from the condensation of sea water in a salt form, which is also indicated.

The brine 14 is then subjected to an evaporation step which produces a raw bittern 20, crystalline salt, 22, and a condensate a drain A. Here again, as noted above, this drain is obtained from the condensation of the vapors from evaporation step 18, which condensation step is not shown.

The raw bittern 20 is then subjected to yet another evaporation step 24. From evaporation step 24, as bottoms, carnallite 26, salt, and potassium salts are obtained. Also obtained is a concentrated bittern 30 and a vapor which is condensed to constitute drain B.

The concentrated bittern 30 is then itself subjected to a further evaporation step 27 which produces solid magnesium chloride 28, and a condensed vapor or drain C.

In summary, therefore, from the initial evaporation of sea water, a series of condensed vapors or drains, A, B, and C, are obtained which result from the sequential evaporation of each of the liquid residues from the sequential evaporation steps 18, 24, and 27.

The foregoing description, as noted hereinabove, pertains to the conventional procedures used in the evaporation of sea water. The following explanation pertains to that portion of the process which relates to the production of heavy sea water.

Drains A, B and C, are combined in line 33, and a small amount of inorganic salt is added to the mixture at line 32. This mixture, with the inorganic salt, is then circulated through cool concentration step, represented generally as 37.

The details of cool concentration step 37 will be discussed in detail in connection with FIG. 2. Suffice it to say at present, however, that the mixture of the drains is circulated in indirect heat exchange with the evaporator used in evaporation step 12. It is possible to circulate the combined drains with any of the other heat sources available in the sea water production process, i.e., the evaporation steps used for the production of drains, A, B, and/or C. Because of the relatively low heat requirements of cool concentration step 37, it is unnecessary to add any outside energy to the process. Thus, only the heat which is left over from the conventional evaporation step used in the salt making process can be utilized, simply by passing the combined drains in indirect heat exchange with the heat sources in those evaporation steps.

After passing in said indirect heat exchange with whatever heat source is available from the sea water production process, the warm drains are then subjected to vaporization in cool concentrator 34. By virtue of the heat exchange, the mixture of the drains is warmed to between room temperature and below 40°C. The resulting mixture, is then allowed to vaporize under atmospheric conditions to produce a vapor, which is lost to the atmosphere, and a concentrated liquid. This heat exchange and vaporization step 37 constitutes what is known as the "former concentration".

From this former concentration, heavy water of about 1 percent concentration is obtained.

The concentrated liquid from cool concentration step 37 is then introduced through line 39, to distillation step 41. Distillation step 41 is a conventional, multi-stage distillation with a cascade condensing apparatus.

From distillation step 41 is obtained a concentrate, 43, which is heavy water having a concentration of greater than 99.8 percent. Also obtained from distillation step 41 are vapors which are condensed and constitute a drain or condensate designated as D.

Since drain D produced at this stage contains about 2 percent heavy water, this drain is returned to cool concentration step 37 through line 45 and is combined with drains A, B, and C.

Cool concentration of sea water refers to concentrating the sea water while it flows down along slender twigs artificially installed in the device. That is to say, the cool concentration step refers to the concentration of a solution at a relatively low temperature by exposing a relatively large surface area of a solution. In this invention, however, the drains (A), (B) and (C) in which the heavy water content has been raised to some extent are further concentrated in the cool concentration apparatus described later.

In the cool concentration, the collected drains (A), (B) and (C) are mixed with 0.1 to 1.5 percent of an inorganic salt, such as, NaCl, MgCl$_2$ and KCl, so as to increase the separation coefficient of light and heavy waters.

The inorganic salts to be added in this stage may be selected from any except those which do not interfere with the evaporation process and are not hazardous. The amount to be added should be between 0.1 to 1 percent calculated as Mg$^{++}$. Addition of the salts below 0.1 percent shows only a slight effect, while for additions over 1 percent, the evaporation speed is lowered, leading to unfavorable results.

The collected drains, to which salts have been added, are warmed above room temperature and below 40°C by heat exchange with the exhaust heat evolved in any of the above described evaporation processes, i.e., the evaporation of the sea water, evaporation of raw bittern or condensed bittern. The temperature of the drains is restricted so as not to exceed 40°C by controlling the flow rate of the drains or controlling the activity of the cooling media in the evaporation processes.

The warmed drains are introduced into the cool concentration apparatus described hereinafter, and are gradually concentrated by evaporating into the atmosphere.

Blowing air toward the cool concentration apparatus increases the evaporation speed, but is best avoided because it decreases the separation coefficient of light and heavy waters.

The cool concentration apparatus is a vessel with the upper part open to the atmosphere, which contains a device to increase the contact or exposure area of the drains to the atmosphere. This will be explained by the apparatus in example.

FIG. 2 shows an apparatus with a circulating device for drains, a heat exchanger and a salt addition device. The heat rejecting part (1) of the flash evaporator of sea water is cooled with the above mentioned collected drains, which are kept at a temperature below 40°C. The direction of flow of the drains is shown by line A.

The drains are sprinkled from above the cool concentration apparatus 2 as shown in FIG. 2. In order to disperse the drains in the form of a thin film or drops and to facilitate the circulation of air, the inside of the cool concentration apparatus is packed with Raschig's rings or vinyl chloride nets 6. Thus, the drains are concentrated by evaporation and at the same time the temperature is decreased when they flow down into the storage tank 3. They are circulated and introduced again into the heat rejection part of the flash evaporator with a pump 4, as cooling water. To the drains, bittern is added from the bittern tank 5 to the storage tank 3 in the amount which is determined in accordance with the heavy water content and the flow speed of the drains from sources A, B and C in FIG. 1.

The preferred conditions of the cool concentration step so as to maximize the separation coefficient of light and heavy water are summarized as follows:

1. Addition of inorganic salt, such as, NaCl, MgCl$_2$ and KCl;

The foregoing explanation referred to addition of bittern containing MgCl$_2$ as major constituent. The most preferable amount of addition is 0.1 to 1.5 percent as Mg$^{++}$, but addition of more than 1.5 percent should be avoided since it decreases the evaporation speed in the cool concentration step.

2. Temperature of the cool concentration step;

The drains to be concentrated shouold be above the room temperature and not over 40°C since the separation coefficient of light and heavy water decreases at temperatures above 40°C.

3. Gradual evaporation;

Gradually evaporating the drains is an important aspect during the cool concentration step. Control of the evaporation rate can be attained by controlling the flow rate or the temperature.

In the example appearing later, a favorable result was obtained by controlling the temperature at an average of 38°C at the time of heat exchange. The steam evolved at the evaporation was dissipated into the atmosphere. When the temperature of drains is raised above 40°C, the rise of temperature can be controlled with efficiency, for example, by increasing the flow rate of the drains.

We have found that when the collected drains are concentrated in this manner, the separation coefficient of light and heavy water was 1.32 for the drains to which salts were not added, but was increased to 2.74 for drains to which 10 liters of 34°Be bittern had been added to 1,000 liters of drain. But the efficiency in evaporation was decreased by 2 percent in the latter case. In comparing the two cases to each other, the recovery of heavy water, when concentrated at the cool temperature, i.e., room temperature to 40°C, a heavy water content of 0.123 to 1.000 percent, was 24.5 percent for the drains to which salts were not added and was 63.5 percent for the drains to which salts were added.

The heat required for the cool concentration step can be obtained from the evaporation stage of sea water using the drains as cooling material, either in a steam condenser in the last stage of a multiple effect evaporator series, or at the heat rejection part of a flash evaporator.

The raw material water containing the low concentration heavy water at a temperature controlled between room temperature and below 40°C, is then transferred to the cool concentration apparatus where the vapors produced are dissipated into the atmosphere and the drains are cooled and concentrated to a reduced volume. This treatment is repeated until the heavy water content is raised up to 1 percent. This water is then introduced into a cascade evaporating tower to obtain a product having 99.8 percent heavy water content.

The later concentration is compared with a process for preparing heavy water by the general distillation method as described in the following paragraphs.

1. Number of stages of the distillation tower (number of minimum theoretical stages)
    In the general process of distillation 231 stages
    in the process of this invention 192 stages
They are expressed by the number of theoretical stages, but the efficiency of stages is approximately 50 percent in practical cases so that they are 462 stages in general and 384 stages for this invention.

2. Maximum recovery of heavy water
    For the general producing methods of distillation
    5.66 percent
    In the present invention, however, the steam dissipating from the top of the distillation tower in the later concentration is condensed and recovered as condensate D (FIG. 1). Since this liquid contains approximately 0.2 percent heavy water, this is returned to the above mentioned drain, which means no loss of heavy water at the distillation tower. Thus, in the present invention, significant loss in the later concentration is avoided.

In the known process of distillation for producing heavy water, about one half, or 0.007 percent, of the heavy water contained is dissipated into the atmosphere from the top of the first distillation tower, leading to the maximum recovery 5.66 percent as described before. In the present invention, however, loss of heavy water occurs only in the cool concentration process, but there is negligible loss in the distillation stage. Since the loss in the cool concentration is 36.5 percent, the maximum recovery amounts to 63.5 percent, that is 10 times as much rate of yield as the conventional process.

In comparing the apparatus, the number of stages of this invention is 83 percent against the general process of distillation being 100 percent, but the heavy water content of the raw water is 0.015 percent in the general distillation process, while that of this invention is 1 percent, so that 1/27 of the diameter of the distillation tower suffices as calculated for 1 kg of product, since the tower diameter is proportional to the square root of the required rate of flow, that is (118000/157) = 27. The equipment required should be one-twentieth considering the number of stages and the tower diameter, but it should be about one-tenth considering that there is a pretreatment, or the cool concentration stage, in the present invention.

On the other hand, the amount of steam to be used for the treatment is 236 tons for 1 kg of heavy water in the general distillating process, but for the present invention 5 ton is sufficient, which corresponds to one-fortyseventh of the former.

The raw bittern, which is added to increase the separation coefficient in the case of the cool concentration, is recovered as residue by evaporating immediately before being transferred to the distillation tower as the later concentration, and then it is used again. The heavy water residue remaining in the tank is also recovered at the same time. There is almost no loss of heavy water in either fraction due to the circulated application.

Further, in the flash evaporation of this invention to obtain low concentration heavy water, the salt concentration is maintained between 5 to 15 percent. The reason for it that, as FIG. 4 shows, experiments have demonstrated that the most favorable separation coefficient, i.e., 2.73 to 4.27, between light and heavy water is obtained when the salt concentration was maintained between 5 and 15 percent. For the salt concentrations below 5 percent or above 15 percent, an unfavorable separation coefficient of less than 2.0 results. Therefore, the salt concentration of the liquid in the flash evaporator should always be maintained at 5 to 15 percent by adjusting the introducing velocity of the approximately 3.5 percent hot sea water which has been concentrated in the cool concentration step. For the sake of illustration, the adjustment of the salt concentration of the liquid in the flash evaporator is shown below.

The salt concentration is measured with a concentration meter at the inlet of a circulator pump of the liquid in the tank, and on the other hand, the amount of the evaporated water is measured with a flowmeter. Those amounts of hot sea water concentrated at cool which are calculated from the above data are introduced into the tank to maintain the concentration at the desired level. In practising the operation, however, the amount of the sea water corresponding to about 80 percent of the evaporated amount is quantitatively added continuously and addition of the sea water corresponding to about 20 percent is adjusted with an installed electromagnetic valve which is controlled by the concentration meter working as a detector.

The separation coefficient of light and heavy water is increased for the evaporation velocity below 100 kg/m²·hr in the flash evaporation as shown in FIG. 5, but a small evaporation velocity gives rise to an economical disadvantage due to the need for larger equipment. Since the separation coefficient becomes small for the evaporation velocity larger than about 1000 kg/m²·hr, the velocity should preferably be 70 to 1000 kg/m²·hr. The most preferable velocity is in the vicinity of 100 kg/m²·hr.

The velocity in which sea water is added is controlled by changing the streaming speed with an electromagnetic valve so as to correspond to the amount of evaporated water that is measured with a flow meter.

Further, in the flash evaporation, the separation coefficient of light and heavy water becomes larger at lower evaporation temperatures, as shown in FIG. 6, but a temperature between 34° and 90°C is chosen from the standpoint of economy and apparatus. of appratus. The evaporation temperature is controlled by changing the flow rate of steam by means of a diaphragm valve, so that the temperature of brine measured with a thermometer at the outlet of a heat exchanger is maintained at a preset level.

The salt concentration, the velocity of evaporation and the temperature of evaporation should be selected in accordance with the manner of evaporation. Thus, the present invention relies on the flash evaporation process for deciding the operational conditions. Various methods of evaporation show different values of separation coefficients of light and heavy waters as seen in FIG. 4. From this fact, the present invention adopts the flash evaporation process and has selected the conditions of the flash evaporation that are favorable to separate heavy water.

The preparation of heavy water is divided into two stages: concentrating sea water to a relatively low concentration of heavy water (to approximately 1 percent of heavy water) and concentrating to a high concentration of heavy water (to approximately 99.8 percent of heavy water). These are designated briefly as former and later concentrations, respectively.

In the process of this invention, however, the concentrating to a low concentration is carried out along with the normal concentration of sea water as used in the sea water utilizing industry. In the concentrating to a high concentration, a sea water sample containing 1 percent of heavy water is distilled alone to obtain a 99.8 percent product. In the concentrating process to a high concentration, the low concentration heavy water distilled out at the top of the first distilling tower is recovered and is again concentrated with the flash evaporating apparatus used exclusively for heavy water. Furthermore, if the original sea water is treated beforehand to remove calcium in the preliminary treatment, troubles giving rise to scaling or corrosion of the apparatus can be avoided with advantages.

The above precaution is connected with the salt concentration of this invention. Also, as will be detailed in the example that appears later, in-line heaters are advantageously used in order to recover heavy water exhaustively.

The main features of the process of this invention are as follows:

1. this is a process for concentrating heavy water in sea water in its naturally occurring concentration of approximately 0.2 percent, up to approximately 1 percent with benefit,
2. the process results in a remarkable increase in the yield of the heavy water production, and
3. this process is advantageously combined with the conventional processes for making common salt from sea water.

More particularly with each of the items, the present invention uses sea water as raw material of which the heavy water content, 0.02 percent, is larger than that of ordinary water, 0.015 percent, in connection with the statement in item (1), and the heat to be exhausted in the sea water utilizing industry is used favorably in the concentrating stage, so that this invention has developed an excellent method to utilize sea water for the two-fold purposes, (1) the sea water utilizing industry and (2) the concentration for heavy water.

As for the item (2), the increase of yield in the preparation of heavy water forms an important factor to reduce the cost. On the other hand, the increase of yield is closely connected with the increase of the separation coefficient of light and heavy water so that the increase of the latter results in the increase of the former. In the present invention where the flash evaporation process is employed, a specified condition in the salt concentration, evaporation velocity and the temperature of evaporation is adopted for the purpose to increase the separation co-efficient of light and heavy water.

As is stated in the item (3), this invention prepares heavy water in parallel with the sea water utilizing industry, because preparation of heavy water is generally carried out in parallel with the production of other products and the sole production of heavy water is restricted to special cases. This is because the heavy water content of sea water is larger than that of water from other origins, and because the production of heavy water which involves concentrating sea water and is accompanied by by-products in the sea water utilizing industry can be performed with economical benefit. In this connection the present invention has developed, as described before, an excellent process which achieves to make plain water from the sea water and to concentrate the sea water and, at the same time, heavy water.

The present invention will be explained in more detail with reference to examples.

EXAMPLE 1:

Sea water, 3.4°Be, was introduced into a flash evaporator in the rate of 100 Kl/day, which was evaporated to produce 80.2 Kl of plain water and 19.8 c8 Kl of 15°Be brine. Due to the evaporated part being almost under the reduced pressure and the action of salts in the sea water, the separation coefficient of light and heavy water is increased, so that almost all of the heavy water is transferred to the brine. Measurement revealed that the heavy water content of plain water was 0.005 percent, while that of brine was 0.08 percent. The plain water obtained was 1 liter and approximately 20 ppm, which was used for drinking or for boilers. The 15°Be brine 19.8 Kl was evaporated in a vacuum 4-fold effect evaporator to obtain 17.700 kg of A drain, 2,440 kg of salts and 1.66 Kl of 34°Be raw bittern. The 34°Be bittern, in turn, was evaporated in a single effect evaporator to obtain 980 kg of B drain, 120 kg of carnallite, 40 kg of salts and 160 kg of bittern salt and 660 liters of 35°Be concentrated bittern. Further the 35°Be bittern was evaporated in a single effect evaporator to obtain 640 kg of solid magnesium chloride and 240 kg of C drain.

The drains A (17,700 kg), B (980 kg) and C (240 kg), that have been described above, were combined together to be transferred to the process of the former concentration. The heavy water content of the collected drains was 0.123 percent.

On the other hand, the heat rejection part of the flash evaporating apparatus, which should be cooled from outside due to the vacuum construction, was cooled by passing through it a cooling liquid consisting of 30 Kl of the collected drains of the heavy water content 0.123 percent, which was composed of 19 Kl of the drains (A), (B) and (C) and 11 liters of the drain (designated as drain (D)) distilled out from the No. 1 tower of the distillation process, and the raw bittern in the proportion of 10 liters per 1000 liters of drain. Therefore the temperature of the drains was increased. In this case the increase of temperature was controlled at above room temperature but below 40°C. The warm drains were introduced into the cool concentrating apparatus and were cooled as well as condensed under atmospheric conditions. The cool concentration apparatus was 6 m high, 4 m deep, 5 m wide and 20 m² in cross-section and packing material was packed in order to spatter the drain in the inside.

The evaporation capacity of this apparatus was 20 liters/m²·hr. The drain concentrated at cool with the cool concentration apparatus was returned to the heat rejection part of the flash evaporator to cool it.

Thus, the former concentration to obtain the heavy water content of 1 percent was achieved by repeating the cycle in which the sequence of rise of temperature, cool concentration, cooling and rise of temperature was circulatingly followed.

The product of the former concentration, in which heavy water was contained in the concentration of 1 percent, was treated in a normal pressure evaporator to separate drain from bittern. The drain produced was introduced into the No. 1 distillation tower in the form of a vapor, while the remainder in the evaporator was returned to the drain for cooling to recover the heavy water content remaining in the bittern.

Seven distillation towers were arranged as shown in FIG. 3, each of them having 70 stages set in cascade. The solution of the 1 percent heavy water content was introduced into the No. 1 tower, concentrated in the successive towers, and finally 10 kg of product containing 99.8 percent heavy water was obtained.

The 15.2 Kl distillate from the No. 1 tower containing 0.2 percent heavy water was returned to the preceding cool concentration apparatus.

What is claimed is:

1. A process for preparing heavy water from sea water which comprises adding 0.1–10.0 percent, calculated as $Mg^{++}$ ion of a soluble halide salt to a mixture of drains produced by the evaporation of sea water in a conventional process for the manufacture of common salt, warming the mixture of drains between room temperature and 40°C using the heat energy from the salt manufacturing process, concentrating the warmed mixture of drains to a heavy water content of about 1 percent by exposing large surface areas of the warmed mixture to the atmosphere, removing the added halide salt from the concentrated mixture by evaporating the mixture, and collecting the condensate from the evaporation step and subjecting the condensate to distillation to yield a high concentration heavy water.

* * * * *